United States Patent
Solntsev et al.

(10) Patent No.: US 10,697,070 B1
(45) Date of Patent: Jun. 30, 2020

(54) CORROSION INHIBITING FILMS

(71) Applicant: Cortec Corporation, White Bear Lake, MN (US)

(72) Inventors: Pavlo Solntsev, White Bear Township, MN (US); Ming Shen, Eagan, MN (US); Robert T. Kean, Minneapolis, MN (US); Boris A. Miksic, Longboat Key, FL (US)

(73) Assignee: Cortec Corporation, White Bear Lake, MN (US)

( * ) Notice: Subject to any disclaimer, the term of this patent is extended or adjusted under 35 U.S.C. 154(b) by 1 day.

(21) Appl. No.: 15/470,231

(22) Filed: Mar. 27, 2017

Related U.S. Application Data

(60) Provisional application No. 62/314,142, filed on Mar. 28, 2016.

(51) Int. Cl.
| | | |
|---|---|---|
| *C23F 11/00* | (2006.01) | |
| *C23F 11/02* | (2006.01) | |
| *C23F 11/173* | (2006.01) | |
| *B32B 27/18* | (2006.01) | |
| *B65D 81/24* | (2006.01) | |
| *B32B 27/30* | (2006.01) | |
| *B32B 27/08* | (2006.01) | |
| *B32B 25/08* | (2006.01) | |

(52) U.S. Cl.
CPC ............. *C23F 11/02* (2013.01); *B32B 25/08* (2013.01); *B32B 27/08* (2013.01); *B32B 27/18* (2013.01); *B32B 27/302* (2013.01); *B65D 81/24* (2013.01); *B32B 2307/21* (2013.01); *B32B 2307/306* (2013.01); *B32B 2307/728* (2013.01)

(58) Field of Classification Search
None
See application file for complete search history.

(56) References Cited

U.S. PATENT DOCUMENTS

| 4,321,297 | A | * | 3/1982 | Adelman | ................ B32B 27/10 |
| | | | | | 428/292.7 |
| 5,736,231 | A | * | 4/1998 | Todt | ....................... B32B 27/12 |
| | | | | | 156/290 |
| 5,855,975 | A | * | 1/1999 | Miksic | ................... B32B 27/06 |
| | | | | | 428/35.8 |
| 6,156,929 | A | * | 12/2000 | Chandler | ............. C08K 5/0033 |
| | | | | | 528/176 |
| 6,420,470 | B1 | * | 7/2002 | Miksic | ................... B32B 27/08 |
| | | | | | 428/34.9 |
| 6,555,600 | B2 | * | 4/2003 | Sobkin | ..................... C08K 3/24 |
| | | | | | 252/387 |
| 7,588,820 | B2 | * | 9/2009 | Berg | ..................... A47J 36/027 |
| | | | | | 428/323 |
| 2003/0213936 | A1 | * | 11/2003 | Kubik | .................... B65D 79/02 |
| | | | | | 252/387 |
| 2007/0145334 | A1 | * | 6/2007 | Numbu | ............... C08K 5/0008 |
| | | | | | 252/388 |
| 2012/0205264 | A1 | * | 8/2012 | Amy | ..................... B32B 25/14 |
| | | | | | 206/205 |

* cited by examiner

*Primary Examiner* — Joseph D Anthony
(74) *Attorney, Agent, or Firm* — Taft Stettinius & Hollister LLP; Audrey J. Babcock

(57) ABSTRACT

A film for inhibiting corrosion including a polymeric resin and a vapor corrosion inhibitor film additive is described. The vapor corrosion inhibitor film additive includes compounds useful to protect metal surfaces from corrosion, such as ammonium or alkylammonium carboxylates and/or a triazole derivative. The film may include multiple layers.

5 Claims, No Drawings

CORROSION INHIBITING FILMS

FIELD OF THE INVENTION

The present invention relates to packaging films for use in inhibiting corrosion of packaged goods generally, and more particularly to films utilizing a combination of corrosion inhibiting materials for enhanced overall corrosion inhibition characteristics.

BACKGROUND OF THE INVENTION

A wide variety of applications exist in commerce and industry wherein materials and products that are susceptible to corrosion may be protected from corrosive environments through the use of packaging or wrapping films. A common example of items in need of protection from corrosion involve materials and/or products manufactured from corrosion-susceptible metals, which tend to corrode through oxidation when exposed to oxygen in either a gaseous or liquid phase. As such, elements in the atmosphere such as gaseous oxygen and water vapor are agents that tend to cause corrosion in metal materials.

Various film forms have been developed and implemented as wrapping about such corrosion-susceptible materials. Examples of such films are discussed in U.S. Pat. Nos. 5,855,975, 6,156,929, 6,420,470, and 7,588,820, the contents of which are incorporated by reference herein. Further examples of films are discussed in European Patent Application Publication No. 1,916,276. Films for wrapping about corrosion-susceptible materials are often referred to as packaging films, as they are often times utilized in conjunction with product packaging applications. However, such films may also or instead be utilized in protective wrapping applications not commonly associated with product packaging. While films fabricated solely of polymeric materials assist in preventing corrosion agent access to the enclosed materials, certain films having further corrosion inhibiting characteristics have been developed and implemented.

Films currently utilized in corrosion inhibiting applications include those which contain vapor corrosion inhibitor (VCI) materials which vaporize from the film into the enclosed package to minimize corrosion caused by aggressive species entering into or contained within the enclosure. A commonly used VCI ingredient comprises nitrite salts, especially sodium nitrite. While nitrite salts are effective, cost competitive, and generally safe to use, they have come under increased scrutiny recently due to environmental and safety concerns. These concerns have prompted a desire for effective VCI films without any nitrite salts in the product.

VCI materials are commonly incorporated in thermoplastic (e.g. polyethylene) via a melt blending process. Corrosion inhibiting thermoplastic alloys are discussed in U.S. Pat. No. 6,555,600, the contents of which are incorporated by reference herein. The VCI materials are preferably present as a particulate material, which becomes dispersed in the thermoplastic. The particle size needs to be sufficiently small so as not to interfere with processing or film forming. The VCI materials also need to be reasonably thermostable at the melt processing temperatures, which are typically in the range of 150-250° C. for polyethylene. Some VCI materials are prone to degradation or chemical reactions at these temperatures. VCI materials with high vapor pressure at these temperatures may show excessive loss due to vaporization. VCI materials that melt at these temperatures may create processing problems due to phase separation and pooling in the extruders. Nitrite salts have been shown to be very stable and effective in melt processing of thermoplastic films. Many potential alternatives are not suitable due to one or more of the above problems.

It is the object of the present invention to provide a packaging film containing a nitrite free combination of VCI materials as a corrosion inhibiting agent.

It is a further object of the present invention to provide a multilayer packaging film in which only some of the layers contain a nitrite free combination of VCI materials as a corrosion inhibiting agent.

SUMMARY OF THE INVENTION

By means of the present invention, a packaging film for use in inhibiting corrosion of packaged materials is provided having VCI characteristics, and containing no nitrite salts.

In a particular embodiment, the packaging film of the present invention includes a polymeric substrate resin and between about 1 and 5% by weight of one or more VCI materials.

In another embodiment, a multiple layer film of the invention includes a first layer of polymeric substrate, and one or more layers containing VCI materials, with the balance being a polymeric substrate.

DETAILED DESCRIPTION OF THE PREFERRED EMBODIMENTS

The objects and advantages enumerated above together with other objects, features, and advances represented by the present invention will now be presented in terms of detailed embodiments which are intended to be representative of various possible embodiments of the invention. Other embodiments and aspects of the invention are recognized as being within the grasp of those having ordinary skill in the art.

Polymer films can be prepared from a polymer melt or polymer dissolved in a solvent. Melt processes are preferred for films of this invention. The most common melt techniques are cast film extrusion and blown film extrusion. With cast film extrusion, a polymer melt is extruded through a linear slot die and drawn over a chilled roll. Cast films are often subject to other downstream processes (e.g. stretching and coating) to form the final product. With blown film extrusion, the polymer melt is extruded through a circular slot die to form a tube. This tube is subject to pressurized air which stretches the tube to produce a bubble, which is subsequently collapsed to form the film product. In both techniques, modern equipment allows several layers of polymer to be co-extruded to form multilayer films. While that may add complexity to the film production process, it enables product attributes that may not be obtainable from a monolayer film.

For any particular film product, the decision on film composition and production process is non-trivial and will depend on the complex interplay between a number of factors including: raw material costs, raw material properties (as pellets, melt, and film), raw material compatibility, end use requirements (e.g. barrier properties and tear strength), regulatory considerations (e.g. food contact), existing capital equipment, safety, operator experience, process reliability/reproducibility, percentage of scrap produced, ability to recycle scrap, etc.

"Vapor corrosion inhibitors" or "VCI materials," as used herein, refer to corrosion inhibiting compounds, which are capable of migrating in the vapor phase to surfaces not in direct contact with the applied compounds. These are also interchangeably referred to as "Vapor phase Corrosion Inhibitors" or "Volatile Corrosion Inhibitors". VCI materials can be dispersed within a plastic film, to protect surfaces enclosed by that film. These inhibitors are also effective if in direct contact with a surface.

"VCI film additives" as used herein typically comprise a volatile corrosion inhibiting component, which is a vapor corrosion inhibitor, and a non-volatile component. Without intending to be bound by theory, the non-volatile component may also have an effect on corrosion inhibition.

Examples of volatile corrosion inhibiting components which have been found highly effective for use in connection with the present invention are amine and ammonium salts, dibasic acid salts, tall oil imidazolines, and triazole compounds (such as benzotriazole or tolyltriazole) or combinations thereof. These volatile components have been found to have highly effective corrosion inhibiting properties when combined with or coated on films in accordance with the present invention.

Volatile corrosion inhibiting components that have been found to be preferable for the current invention may include ammonium and/or alkylammonium salts of carboxylates, which may be obtained by a reaction of ammonia or alkyl amines respectively with carboxylic acids. The number of carbon atoms in the amine part may vary in the range of C2-C8, preferably C2-C6. Some examples of the amines include: 2-aminoethanol, cyclohexylamine, 1-amino-2-propanol, 2-(N,N-dimethylamino)ethanol, 2-(N,N-diethylamino)ethanol, 3-(dimethylamino)propylamine, diisopropylamine, and bis(2-methylpropyl)amine. The number of carbon atoms in the carboxylic acid part may vary in the range of C2-C10, preferably C3-C8. Some examples of the carboxylic acids include: propionic acid, butanoic acid, pentanoic (valeric) acid, 3-methylbutanoic acid (isovaleric acid), octanoic acid, decanoic acid, benzoic acid, 2-ethylhexanoic acid, 2-methylbutanoic acid, and 2,5,5-trimethylhexanoic acid. Though a wide variety of such volatile components may be utilized in the films of the present invention, examples of suitable volatile corrosion inhibitor components include: ammonium propionate, ammonium octanoate, ammonium 3,5,5-trimethylhexanoate, cyclohexylammonium propionate, cyclohexylammonium octanoate, cyclohexylammonium 3,5,5-trimethylhexanoate, dimethyl-2-hydroxyethylammonium propionate, dimethyl-2-hydroxyethylammonium octanoate, dimethyl-2-hydroxyethylammonium 3,5,5-trimethylhexanoate and combinations thereof.

As stated above, the VCI film additives preferably include at least one non-volatile component such as amorphous silica (including forms commonly called fumed silica and silica gel), calcium carbonate, waxes, and non-volatile salts of aliphatic or aromatic acids, e.g. magnesium or calcium stearates. These additional ingredients may serve some or all of the following functions in the formula: adsorbent, absorbent, moisture scavenger, dispersing aid, surfactant, contact corrosion inhibitor, pH modifier/buffer, or film slip or antiblock agent. Suitable waxes may include natural and synthetic waxes. Microcrystalline waxes are especially suitable. In cases in which some or all of the volatile corrosion inhibiting components are liquid at processing temperatures, the non-volatile components may have a critical role in keeping the volatile components dispersed and active in the polymer melt.

The VCI film additives are preferably prepared and available in particulate form with particles being of a preferred size range. For most film applications, the VCI film additives found most useful have a maximum particle size range less than about 50 microns, with a size of between about 20 and 30 microns being preferred.

Formulations and blends of films useful in the present invention are described in detail herein below, and with reference to the examples. The films of the present invention include VCI film additives blended with a polymeric substrate resin, preferably a thermoplastic polymeric resin, most preferably polyethylene. The blends are preferably formed into single or multiple layer films through a single step process, such as through extrusion or co-extrusion film-forming processes. Other single-step film formation techniques, however, are contemplated by the present invention as being useful in producing the protective films of the present invention.

As the examples below demonstrate, VCI film additives are preferably blended into the films of the present invention at a concentration of between about one and five percent by weight.

The VCI film additives are preferably added in solid form to the plastic resin via melt mixing, when the plastic resin is a thermoplastic.

In one embodiment of this invention, the VCI film additives may first be blended in to plastic resin at high concentration to form a "masterbatch". Said masterbatch is then blended in an appropriate ratio with additional plastic resin to achieve the desired VCI film additives concentration in the final product. The concentration of VCI film additives in the masterbatch is preferably in the range of 5-60% by weight, more preferably in the range of 10-40% by weight and most preferably in the range of 20-30% by weight.

Films of the present invention comprise one or more layers. The first layer comprises the VCI film additives dispersed in a polymer composition which exhibits process and film compatibility with the VCI film additives. The loading of VCI film additives in the first layer can be added at any effective level, but typically would be added at 0.5-10%, and more typically 1-5%. However, by concentrating the inhibitor in one film layer (of a multilayer film), effective corrosion inhibition is provided with a lower overall loading (compared to a monolayer film). A practical upper limit is established when the compounded material is no longer capable of producing an acceptable film layer. This will likely vary with film production technique, the specific polymer composition, and the specific composition of the VCI film additives. However, VCI film additives are usually only added in amounts sufficient to provide the desired corrosion protection.

The film may have additional layers of similar or different composition. These may be used for example to increase film thickness, alter physical properties, utilize scrap or recycled materials, or alter barrier properties. The number of layers may be practically dictated by the die configuration on available equipment. In that case, it may be advantageous to have the same polymer melt or polymer composition feed two or more dies, if the number of dies exceeds the desired number of film layers. The relative thickness of film layers is typically adjusted to balance cost, film properties, film quality, and process efficiency.

Films of the present invention may optionally comprise other additives routinely used in polymer processing, including but not limited to: lubricating agents, processing aids, pigments, colorants, dyes, stabilizers, antioxidants, fillers, plasticizers, melt strength modifiers, impact modifiers, flame retardants, compatibilizing agents, clarifying agents, nucleating agents, etc. These additives may be included in one or more layers.

In some embodiments of the invention, the first layer may also contain a dye, pigment, or other additive or modifier, so that the layer containing the VCI film additives may be easily distinguished from the other surface layer of the film.

Films of the present invention may include additional layers applied through additional processing steps, including but not limited to: melt coating, emulsion coating, dispersion coating, sputtering, lamination, vapor phase deposition, solvent casting, printing processes, etc.

The films of this invention are typically used to enclose and protect a corrodible object. In such use, the film would be oriented such that the first layer (containing VCI film additives) is towards the object. This allows the VCI materials to diffuse from the first layer into the enclosed space to optimally protect the enclosed object from corrosion. In some embodiments, the second or additional layers may be selected to provide an increased barrier to water, water vapor, oxygen, acidic vapors, and/or volatile sulfur compounds, which will further protect the enclosed article from corrosion. In some embodiments of the present invention, VCI film additives are included in one or more layers adjacent to the first layer, (increasing the overall loading of VCI film additives in the film) so as to increase the effectiveness or useful life of the product for corrosion prevention. In some embodiments of the invention, the films may be formed into bags.

In some embodiments, the films of the present invention are formed through a blown film process. In some embodiments, the films are clear or semi-clear. Films of the present invention may be made to any suitable thickness. A film thickness of 0.5 to 10.0 mils is fairly common for many commercial uses. For bags, film thicknesses of 0.5 to 2.0 mils are common. Film widths and lengths are limited only by the size of the processing equipment.

In a particularly preferred embodiment of the invention, a multiple layer film is obtained in a single-step co-extrusion process. The multiple layer film includes a first layer (which would generally serve as the interior side of a packaging product) including a polymeric resin and between about 1 and 10% by weight of VCI film additives (with a balance of polymeric resin and/or common polymer additives), a second layer including between about 0 and 10% by weight VCI film additives (with a balance of polymeric resin and/or common polymer additives), and a third layer (which would generally serve as the exterior side of a packaging product) comprising polymeric resin and/or common polymer additives.

The above construction is desirable in some situations as it effectively provides VCI protection to articles packaged in the film, while minimizing the amount of VCI materials in the film and incidental exposure of workers to such VCI materials while handling the film or packaged articles.

EXAMPLES

Vapor Inhibitor Ability (VIA) is tested according to Federal Standard 101C, Method 4031, Procedure B.

In brief, film (2 pieces, 1×6 inches each) containing VCI materials is suspended for 2 hours in proximity to a cleaned surface of steel (Carbon steel plugs; SAE 1010 CR 22 S 698 ⅝"×½" hollow, METASPEC Co) in a container at 40° C. and a controlled relative humidity (via solution of 3% glycerol in the bottom of the jar). Samples are then visually inspected relative to a control sample and graded from 0 to 3, with 0 indicating no corrosion inhibition and 3 indicating good corrosion inhibition. A score of 2 or 3 is considered as passing. The test can also be run to test powders of the corrosion inhibitor. In this case, the powder is weighed into a small cup that is placed in the bottom of the test jar.

Contact corrosion inhibition is tested as follows. Carbon steel panels are cleaned in methanol and dried. Two drops of deionized (DI) water are placed on the metal panel and covered with a film sample. After two hours, the substrate is removed and the panels inspected. Panels with any sign of corrosion, pitting or staining are deemed to "fail" the test. A second test is conducted with copper panels. The method is the same except that a 0.005% (by weight) sodium chloride solution is used instead of water and the test time is extended to 4 hours.

VCI film additives and masterbatches for use in example film blends were prepared as follows:

Volatile Corrosion Inhibiting Component Preparation

Inhibitor 410: Propionic acid (5.0 g; 67.6 mmol), caprylic acid (19.5 g; 135.1 mmol), and 3,5,5-trimethylhexanoic acid (42.76 g; 270.3 mmol) were stirred at room temperature. Cyclohexylamine (53.55 g; 540 mmol) was added drop-wise. The reaction mixture was heated to maintain a liquid phase. After a clear solution was formed, the mixture was cooled down.

Inhibitor 420: Propionic acid (5.0 g; 67.6 mmol), caprylic acid (19.5 g; 135.1 mmol), and 3,5,5-trimethylhexanoic acid (42.76 g; 270.3 mmol) were stirred at room temperature. Ethanolamine (33.0 g; 540 mmol) was added drop-wise leading to a viscous solution. Benzotriazole (10 g) was added and the mixture was stirred until a clear solution was formed. This mixture remains a clear liquid even at room temperature.

Inhibitor 440: Propionic acid (5.0 g; 67.6 mmol), caprylic acid (19.5 g; 135.1 mmol), and 3,5,5-trimethylhexanoic acid (42.76 g; 270.3 mmol) were stirred at room temperature. N,N-dimethylethanolamine (48.2 g; 540 mmol) was added drop-wise leading to a viscous solution. Benzotriazole (11.55 g) was added and the mixture was stirred until a clear solution was formed. This mixture remains a clear liquid even at room temperature.

Inhibitor 440a: Propionic acid (10.0 g; 0.135 mol), caprylic acid (25.96 g; 0.18 mol) were stirred at room temperature. N,N-dimethylethanolamine (28.11 g; 0.316 mol) was added drop-wise leading to a viscous solution. Benzotriazole (6.41 g) was added and the mixture was stirred until a clear solution was formed. This mixture remains a clear liquid even at room temperature.

Inhibitor 440b: Propionic acid (3.0 g; 40.54 mmol) and caprylic acid (35.08 g; 243.24 mmol) were stirred at room temperature. N,N-dimethylethanolamine (28.91 g; 324.32 mmol) was added drop-wise leading to a viscous solution. Benzotriazole (6.7 g) was added and the mixture was stirred until clear solution was formed. This mixture remains a clear liquid even at room temperature.

Inhibitor 440c: Propionic acid (3.0 g; 40.54 mmol) and 3,5,5-trimethylhexanoic acid (38.48 g; 243.24 mmol) were stirred at room temperature. N,N-dimethylethanolamine (28.91 g; 324.32 mmol) was added drop-wise leading to a viscous solution. Benzotriazole (7.04 g) was added and the mixture was stirred until a clear solution was formed. This mixture remains a clear liquid even at room temperature.

Inhibitor 665: Propionic acid (5.0 g; 67.6 mmol), caprylic acid (19.5 g; 135.1 mmol), and 3,5,5-trimethylhexanoic acid (42.76 g; 270.3 mmol) were stirred at room temperature. 2-amino-2-methyl-1-propanol (50 g; 500 mmol) was added drop-wise leading to a viscous solution. Benzotriazole (11.7 g) was added and the mixture was stirred until a clear solution was formed. It was also heated using heating gun to maintain liquid phase. After cooling to room temperature the mixture turned to a solid.

Inhibitor 695: Propionic acid (5.0 g; 67.6 mmol), caprylic acid (19.5 g; 135.1 mmol), and 3,5,5-trimethylhexanoic acid (42.76 g; 270.3 mmol) were stirred at room temperature. Ammonium hydroxide (38.5 mL; 500 mmol) was added drop-wise leading to a viscous foamy solution.

VCI Film Additive Preparation:

VCI Film Additive 410a:

Silica gel (24.0 g) was blended with magnesium stearate (8 g) in a high speed mixer for 1 min. Inhibitor 410 (10.4 g) and benzotriazole (1.04 g) were added and the mixture was blended together for 30 sec. Calcium carbonate (16 g) and microcrystalline wax (16 g) were added and the mixture was blended for 1 min leading to a fine white powder.

VCI Film Additive 410b:

Silica gel (24.0 g) was blended with magnesium stearate (8 g) in a high speed mixer for 1 min. Inhibitor 410 (10.4 g) and benzotriazole (1.04 g) were added and the mixture was blended together for 1min leading to a fine white powder.

VCI Film Additive 420:

Silica gel (24.0 g) was blended with magnesium stearate (8 g) in a high speed mixer for 1 min. Inhibitor 420 (11.4 g) was added and the mixture was blended together for 30 sec. Calcium carbonate (16 g) and microcrystalline wax (16 g) were added and the mixture was blended for 1 min leading to a fine white powder.

VCI Film Additive 440a:

Silica gel (24.0 g) was blended with magnesium stearate (8 g) in a high speed mixer for 1 min. Inhibitor 440 (11.4 g) was added and the mixture was blended together for 30 sec. Calcium carbonate (16 g) and microcrystalline wax (16 g) were added and the mixture was blended for 1min leading to a fine white powder.

VCI Film Additive 440b:

Silica gel (24.0 g) was blended with magnesium stearate (8 g) in a high speed mixer for 1 min. Inhibitor 440 (11.4 g) was added and the mixture was blended together for 1 min leading to a fine white powder.

VCI film additive 440c:

Silica gel (12.08 g) was blended with magnesium stearate (4 g) in a high speed mixer for 1 min. Inhibitor 440a (5.72 g) was added and the mixture was blended together for 30 sec. Calcium carbonate (8 g) and microcrystalline wax (8 g) were added and the mixture was blended for 1 min leading to a fine white powder.

VCI Film Additive 440d:

Silica gel (12.0 g) was blended with magnesium stearate (4 g) in a high speed mixer for 1 min. Inhibitor 440c (5.72 g) was added and the mixture was blended together for 30 sec. Calcium carbonate (8 g) and microcrystalline wax (8 g) were added and the mixture was blended for 1min leading to a fine white powder.

VCI Film Additive 440e:

Silica gel (12.0 g) was blended with magnesium stearate (4 g) in a high speed mixer for 1 min. Inhibitor 440d (5.72 g) was added and the mixture was blended together for 30 sec. Calcium carbonate (8 g) and microcrystalline wax (8 g) were added and the mixture was blended for 1min leading to a fine white powder.

VCI Film Additive 440f.

Silica gel (23.5 g) was blended with magnesium stearate (11.8 g) and sodium benzoate (5.88 g) in a high speed mixer for 1 min. Inhibitor 440 (58.8 g) was added and the mixture was blended together for 30 sec leading to a fine white powder.

VCI Film Additive 440g:

Silica gel (20.0 g) was blended with magnesium stearate (25.0 g) and sodium benzoate (5.0 g) in a high speed mixer for 1 min. Inhibitor 440 (50.0 g) was added and the mixture was blended together for 30 sec leading to a fine white powder.

VCI Film Additive 665:

Silica gel (24.0 g) was blended with magnesium stearate (8 g) in a high speed mixer for 1 min. Inhibitor 665 (11.4 g) was added and the mixture was blended together for 30 sec. Calcium carbonate (16 g) and microcrystalline wax (16 g) were added and the mixture was blended for 1 min leading to a fine white powder.

VCI Film Additive 695:

Silica gel (24.0 g) was blended with magnesium stearate (8 g) in a high speed mixer for 1 min. Inhibitor 695 (10.4 g) was added and the mixture was blended together for 30 sec. Calcium carbonate (16 g) and microcrystalline wax (16 g) were added and the mixture was blended for 1min leading to a fine white powder.

The above formulas that pass VIA testing are suitable for preparing a VCI masterbatch in a suitable polymer, which is then diluted with additional polymer to produce the desired loading of VCI materials in the film.

Masterbatch Examples

VCI film additives used for masterbatch preparations are given below:

| VCI film additive 410a | | | |
|---|---|---|---|
| Function | Product name | %, w/w | CAS# |
| Volatile corrosion inhibiting components | Propionic acid | 0.57 | 79-09-4 |
| | Caprylic acid | 2.23 | 124-07-2 |
| | Isononanoic acid | 4.88 | 3302-10-1 |
| | Cyclohexylamine | 6.11 | 108-91-8 |
| | Benzotriazole | 1.38 | 95-14-7 |
| Non-volatile components | Magnesium stearate | 10.60 | 557-04-0 |
| | Silica gel | 31.81 | 112926-00-8 |
| | Calcium carbonate | 21.21 | 471-34-1 |
| | wax | 21.21 | 64742-43-4 64742-51-4 |

VCI film additive 410a contains approximately 84.83% non-volatile components and 15.17% volatile components.

| VCI film additive 410b | | | |
|---|---|---|---|
| Function | Product name | %, w/w | CAS# |
| Volatile corrosion inhibiting components | Propionic acid | 0.99 | 79-09-4 |
| | Caprylic acid | 3.87 | 124-07-2 |
| | Isononanoic acid | 8.47 | 3302-10-1 |
| | Cyclohexylamine | 10.62 | 108-91-8 |
| | Benzotriazole | 2.43 | 95-14-7 |
| Non-volatile components | Magnesium stearate | 18.40 | 557-04-0 |
| | Silica gel | 55.22 | 112926-00-8 |

VCI film additive 410b contains approximately 73.62% non-volatile components and 26.38% volatile components.

| VCI film additive 440a | | | |
|---|---|---|---|
| Function | Product name | %, w/w | CAS# |
| Volatile corrosion | Propionic acid | 0.60 | 79-09-4 |
| | Caprylic acid | 2.33 | 124-07-2 |

-continued

VCI film additive 440a

| Function | Product name | %, w/w | CAS# |
|---|---|---|---|
| Volatile corrosion inhibiting components | Isononanoic acid | 5.10 | 3302-10-1 |
| | N,N-dimethylaminoethanol | 5.75 | 108-01-8 |
| | Benzotriazole | 1.38 | 95-14-7 |
| Non-volatile components | Magnesium stearate | 10.60 | 557-04-0 |
| | Silica gel | 31.81 | 112926-00-8 |
| | Calcium carbonate | 21.21 | 471-34-1 |
| | wax | 21.21 | 64742-43-4 |
| | | | 64742-51-4 |

VCI film additive 440a contains approximately 84.83% non-volatile components and 15.17% volatile components.

VCI film additive 440b

| Function | Product name | %, w/w | CAS# |
|---|---|---|---|
| Volatile corrosion inhibiting components | Propionic acid | 1.00 | 79-09-4 |
| | Caprylic acid | 3.88 | 124-07-2 |
| | Isononanoic acid | 8.51 | 3302-10-1 |
| | N,N-dimethylaminoethanol | 10.66 | 108-01-0 |
| | Benzotriazole | 2.29 | 95-14-7 |
| Non-volatile components | Magnesium stearate | 18.41 | 557-04-0 |
| | Silica gel | 55.25 | 112926-00-8 |

VCI film additive 440b contains approximately 73.66% non-volatile components and 26.34% volatile components.

Masterbatch 1

A masterbatch of VCI film additive 410a is prepared with a co-rotating twin screw extruder, with zones at temperatures in the range of 110 to 175° C. A commercial linear low density polyethylene (LLDPE), with melt index of about 2 (measured at 190° C., 2.16 kg) is provided as pellets. This is fed into the extruder throat with powder of formula 1 with a ratio of 70 parts LLDPE to 30 parts powder. The extruder output is pelletized and collected.

Masterbatch 2

A masterbatch of VCI film additive 440a is prepared with a co-rotating twin screw extruder, with zones at temperatures in the range of 110 to 175° C. A commercial linear low density polyethylene (LLDPE), with melt index of about 2 (measured at 190° C., 2.16 kg) is provided as pellets. This is fed into the extruder throat with powder of formula 1 with a ratio of 70 parts LLDPE to 30 parts powder. The extruder output is pelletized and collected.

Masterbatch 3

A masterbatch of VCI film additive 410b is prepared with a co-rotating twin screw extruder, with zones at temperatures in the range of 110 to 175° C. A commercial LLDPE, with melt index of about 2 (measured at 190° C., 2.16 kg) is provided as pellets. This is fed into the extruder throat with powder of formula 2 with a ratio of 80 parts LLDPE to 20 parts powder. The extruder output is pelletized and collected.

Masterbatch 4

A masterbatch of VCI film additive 440b is prepared with a co-rotating twin screw extruder, with zones at temperatures in the range of 110 to 175° C. A commercial LLDPE, with melt index of about 2 (measured at 190° C., 2.16 kg) is provided as pellets. This is fed into the extruder throat with powder of formula 2 with a ratio of 80 parts LLDPE to 20 parts powder. The extruder output is pelletized and collected.

Film Examples

Film Example 1

A monolayer film product containing VCI film additive is produced by blown film extrusion, by using a single screw extruder coupled to a ring die (die gap 0.75 mm). The extruder zones and die are heated to about 175° C. Pellets of Masterbatch 1 are pellet blended with commercial film grade polyethylene (Melt Flow Index (MFI) of about 1, measured at 190° C., 2.16 kg) in a weight ratio of 80 parts polyethylene to 20 parts masterbatch, and fed to the extruder. The blown film line is run at a blow up ratio of about 2.5:1, yielding a film approximately 75 micrometers thick, which contains about 6 percent (by weight) of VCI film additive (about 0.91% volatile components and about 5.09% non-volatile components). The film fails the VIA test, however, some corrosion protection is observed.

Film Example 2

A monolayer film product containing VCI film additive is produced by blown film extrusion, by using a single screw extruder coupled to a ring die (die gap 0.75 mm). The extruder zones and die are heated to about 175° C. Pellets of Masterbatch 2 are pellet blended with commercial film grade polyethylene (MFI of about 1, measured at 190° C., 2.16 kg) in a weight ratio of 80 parts polyethylene to 20 parts masterbatch, and fed to the extruder. The blown film line is run at a blow up ratio of about 2.5:1, yielding a film approximately 75 micrometers thick, which contains about 6 percent (by weight) of VCI film additive (about 0.91% volatile components and about 5.09% non-volatile components). The film passes the VIA test and standard tests for contact corrosion protection.

Film Example 3

A monolayer film product containing VCI film additive is produced by blown film extrusion, by using a single screw extruder coupled to a ring die (die gap 0.75 mm). The extruder zones and die are heated to about 175° C. Pellets of Masterbatch 3 are pellet blended with commercial film grade polyethylene (MFI of about 1, measured at 190° C., 2.16 kg) in a weight ratio of 80 parts polyethylene to 20 parts masterbatch, and fed to the extruder. The blown film line is run at a blow up ratio of about 2.5, yielding a film approximately 75 micrometers thick, which contains about 4 percent (by weight) of VCI film additive (about 1.06% volatile components and about 2.94% non-volatile components). The film passes the VIA test and standard tests for contact corrosion protection.

Film Example 4

A monolayer film product containing VCI film additive is produced by blown film extrusion, by using a single screw extruder coupled to a ring die (die gap 0.75 mm). The extruder zones and die are heated to about 175° C. Pellets of Masterbatch 4 are pellet blended with commercial film grade polyethylene (MFI of about 1, measured at 190° C., 2.16 kg) in a weight ratio of 80 parts polyethylene to 20 parts masterbatch, and fed to the extruder. The blown film line is run at a blow up ratio of about 2.5, yielding a film approximately 75 micrometers thick, which contains about 4 percent (by weight) of VCI film additive (about 1.05% volatile components and about 2.95% non-volatile components). The film passes the VIA test and standard tests for contact corrosion protection.

Film Example 5

A coextruded (coex) film containing VCI film additive is produced as follows. Powder of VCI film additive 440b is compounded directly into commercial film grade polyethylene (MFI of about 1, measured at 190° C., 2.16 kg) with a twin screw extruder to a loading of about 5% by weight to produce "VCI polyethylene blend". Film is then produced on a 3 layer blown film line (with a 1.5 mm die gap) as follows. A pellet blend of 50 parts by weight of VCI polyethylene blend and 50 parts polyethylene (film grade MFI of about 1) is fed into a first extruder supplying polymer melt to the die for layer 1. A pellet blend of parts by weight of VCI polyethylene blend and 75 parts polyethylene (film grade MFI of about 1) is fed into the extruder supplying the die for layer 2. Plain polyethylene is fed to the extruder supplying the die for layer 3. The melt for all three layers (and the dies) is maintained at a temperature of about 170° C. The extruder melt flow is adjusted so that mass ratios of the layers are approximately 25/50/25 (for layers 1, 2, and 3 respectively). The line is operated at a blow-up ratio of approximately 2.5:1. The draw ratio is adjusted to produce film samples with thicknesses of 60, 70, 80, and 100 micrometers. The resulting films show acceptable mechanical properties and pass VIA and tests for contact corrosion inhibition. The bulk composition is approximately 1.25% VCI film additive by weight (about 0.33% volatile components and about 0.92% non-volatile components), but is approximately 2.5% VCI film additive in film layer 1.

Bag Example 1

The 80 micrometer thick film of Film Example 5 is produced such that the layer 1 is in the interior of the film bubble. The flat film tube is subsequently passed through a sealing and perforation step to produce bags on a roll.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A film for inhibiting corrosion, comprising:
   a polymeric resin; and
   a vapor corrosion inhibitor (VCI) film additive in a range of between about 1% and about 10% by weight of the film, the VCI film additive comprising a volatile corrosion inhibiting component and an additional ingredient, wherein the volatile corrosion inhibiting component comprises an ammonium or alkylammonium carboxylate, or a combination thereof, and a triazole derivative;
   wherein the additional ingredient comprises a non-volatile component, and said non-volatile component is amorphous silica, calcium carbonate, wax, a salt of stearic acid, or a combination thereof,
   and wherein the ratio of the non-volatile component to the volatile corrosion inhibiting component, by weight, is in a range of between about 0.5 and about 6.0.

2. The film of claim 1, wherein an alkylammonium moiety of the alkylammonium carboxylate comprises a number of carbons within a range of from two to eight, and a carboxylate moiety of the alkylammonium carboxylate comprises a number of carbons within a range of from two to ten.

3. The film of claim 1, wherein the alkylammonium carboxylate is a carboxylate obtained by a reaction of cyclohexylamine or 2-(N,N-dimethylamino)ethanol with propionic acid, octanoic acid, and 2,5,5-trimethylhexanoic acid.

4. The film of claim 1, wherein the triazole derivative is benzotriazole, tolyltriazole, or a combination thereof.

5. The film of claim 1, wherein a nitrite content of the film does not exceed 1% by weight of the film.

\* \* \* \* \*